(12) United States Patent
Deshpande et al.

(10) Patent No.: US 9,513,374 B2
(45) Date of Patent: Dec. 6, 2016

(54) MEASUREMENT ERROR COVARIANCE IN GNSS RECEIVER CIRCUITRY, PSEUDORANGES, REFERENCE POSITION

(71) Applicant: Texas Instruments Incorporated, Dallas, TX (US)

(72) Inventors: Atul Deshpande, Bangalore (IN); Sthanunathan Ramakrishnan, Bangalore (IN); Sandeep Rao, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 822 days.

(21) Appl. No.: 13/710,154

(22) Filed: Dec. 10, 2012

(65) Prior Publication Data
US 2014/0159950 A1 Jun. 12, 2014

(51) Int. Cl.
*G01S 19/40* (2010.01)
*G01S 19/22* (2010.01)
*G01S 19/49* (2010.01)
*G01S 5/02* (2010.01)

(52) U.S. Cl.
CPC .............. *G01S 19/40* (2013.01); *G01S 5/0294* (2013.01); *G01S 19/22* (2013.01); *G01S 19/49* (2013.01)

(58) Field of Classification Search
CPC .......... G01S 19/40; G01S 19/22; G01S 19/49; G01S 5/0294
USPC .................................................... 342/357.23
See application file for complete search history.

(56) References Cited

U.S. PATENT DOCUMENTS

| | | | | |
|---|---|---|---|---|
| 5,959,575 A | * | 9/1999 | Abbott | G01C 21/00 342/357.31 |
| 6,211,817 B1 | * | 4/2001 | Eschenbach | G01S 19/07 342/357.31 |
| 7,940,210 B2 | * | 5/2011 | Fly | G01S 19/20 340/539.13 |
| 7,982,667 B2 | * | 7/2011 | Vollath | G01S 19/32 342/357.23 |

(Continued)

OTHER PUBLICATIONS

Leger et al., "Methods for Systemic Investigation of Measurement Error Covariance Matrices", Mar. 5, 2005.*
Roylance, David "Matrix and Index Notation", Sep. 18, 2000.*

*Primary Examiner* — Frank J McGue
(74) *Attorney, Agent, or Firm* — Lawrence J. Bassuk; Frank D. Cimino

(57) ABSTRACT

A Global Navigation Satellite System (GNSS) receiver determines a measurement error covariance from a reference position and a set of measured pseudoranges from a set of GNSS satellites. The position and velocity solution is determined from the measurement error covariance and the set of measured pseudoranges. The measurement error covariance is determined as function of the difference between a reference pseudorange and measured pseudorange. The reference pseudorange is computed from the reference position to a satellite. The measurement error covariance is determined as function of the difference only if the measured pseudorange is greater than the reference pseudorange. The GNSS receiver also determines measurement error covariance as function of one or more of correlation peak shape, difference, the correlation peak shape, a received signal to noise ratio and a tracking loop error.

6 Claims, 6 Drawing Sheets

(56) References Cited

U.S. PATENT DOCUMENTS

| | | | |
|---|---|---|---|
| 2002/0186165 A1* | 12/2002 | Eschenbach | G01S 19/09 342/357.46 |
| 2004/0160365 A1* | 8/2004 | Riley | G01S 5/0278 342/451 |
| 2010/0090888 A1* | 4/2010 | Kangas | G01S 19/07 342/357.46 |

* cited by examiner

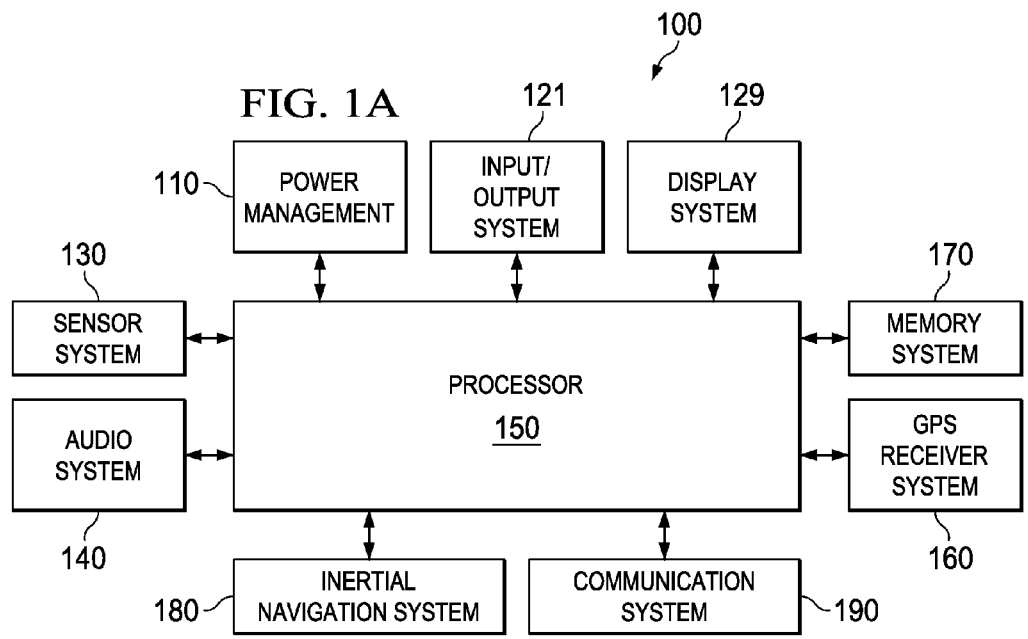
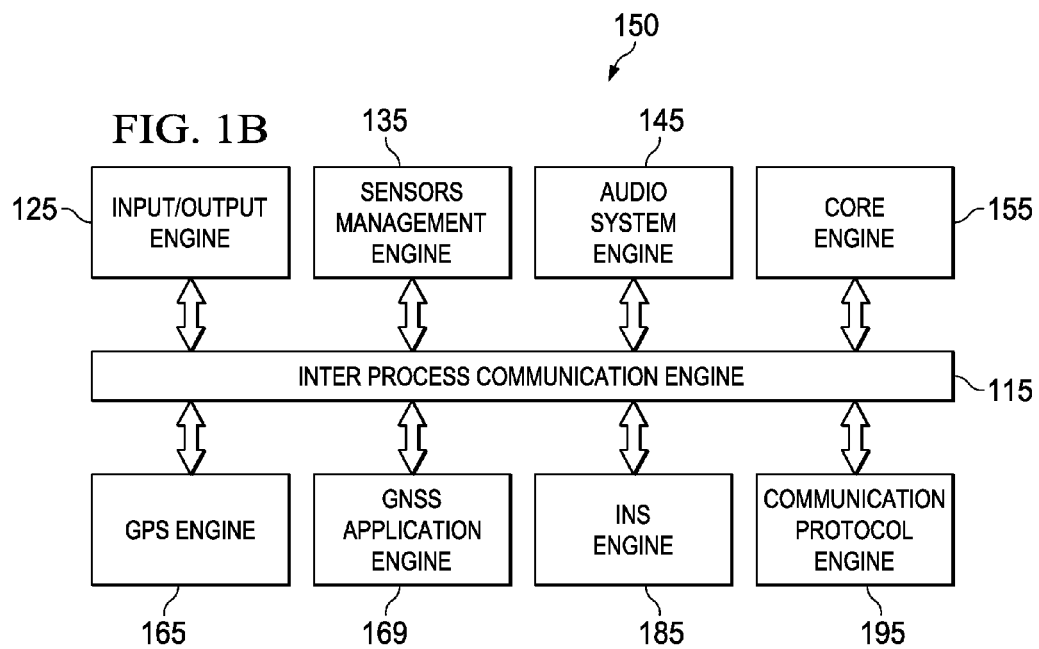

MEASUREMENT ERROR COVARIANCE IN GNSS RECEIVER CIRCUITRY, PSEUDORANGES, REFERENCE POSITION

TECHNICAL FIELD

The present disclosure relates generally to the Global Navigation Satellite System (GNSS) and more specifically to a method, apparatus and system for reducing the inaccuracy in GNSS position and/or velocity solutions.

RELATED ART

GNSS generally refers to a group of orbiting satellites dedicated for transmitting/broadcasting information that are used for navigational purposes. The term "Global" refers to global availability of signals from a minimum number of satellites that are required for navigation at all times. Often, satellites belong to one system (hereinafter "GNSS satellites") that operate in conjunction with one another and are controlled from one or more ground stations. More than one GNSS is currently operative and United States Global Positioning System (GPS) is an example of a GNSS. Each GNSS satellite transmits information in the form of radio signals that contain the details of its position in the space and a time reference, in addition to other information. Different GNSS systems use different radio signal formats and frequency ranges.

Since GNSSs work in similar way, description in this disclosure is made with reference to GPS system for brevity. The GPS satellite system transmits two radio signals that are referred to as L1 and L2. The L1 signal, transmitted at frequency 1575.42 MHz, contains a Course/Acquisition (C/A) code and a P-code.

A GNSS receiver generally refers to an electronic device that receives radio signals from number of GNSS satellites to determine a position and velocity solution. GNSS receivers perform computations, often referred to as triangulation, to arrive at the position and velocity solutions. GNSS receivers are also implemented to use information from other augmentation systems such as inertial navigation systems, cellular systems and the like to determine the position and velocity solution.

The position and velocity solution computed by the GNSS receiver generally comprises a position and a velocity in a particular coordinate system, with respective uncertainties. The uncertainty often indicates the extent of inaccuracy in the computed position and the velocity. The uncertainty parameter is often presented in the form of covariance or error covariance. The error covariance helps the user or a GNSS application (making use of the solution) to quantitatively assess the quality of the GNSS receiver output/solution.

The GNSS application generally processes the receiver output/solution to provide some desired functionality to a user. GNSS applications such as but not limited to, road transport applications, aviation applications, in-ear navigation applications, agriculture and fisheries applications, consumer device applications, etc., often require an accurate position and velocity from the receiver. For example, a navigation assistant (an in-car GNSS navigation application) using a GNSS receiver for navigation generally requires a position accuracy and uncertainty of less than 10 m (meters) to navigate in urban area where street separation is 20 m. The error covariance helps the navigation assistant in providing better user experience and also helps in blending other augmentation information with the GNSS receiver output.

Generally, the GNSS receiver determines the error covariance based on signal characteristics such as signal to noise ratio (S/N) of the received signal and errors in GNSS receiver components, such as the loop error of tracking filters.

SUMMARY

According to one embodiment, a GNSS receiver determines the measurement error covariance from a reference position. In one embodiment, the measurement error covariance is determined as a function of the difference between a reference pseudorange and a measured pseudorange. The reference pseudorange is computed as range from the reference position to a satellite. The position and velocity solution is determined from the measurement error covariance and a set of measured pseudoranges. According to another aspect, the measurement error covariance is determined as the function of the difference only if the measured pseudorange is greater than the reference pseudorange.

According to another aspect, the GNSS receiver determines the measurement error covariance as a function of correlation peak shape, difference in the received signal to noise ratio and/or tracking loop error.

BRIEF DESCRIPTION OF THE DRAWINGS

FIG. 1A is an example device in which various aspects of the present disclosure are seen;

FIG. 1B is a block diagram depicting an example of a processor in the example devices of FIG. 1A;

DETAILED DESCRIPTION

Figure 2:
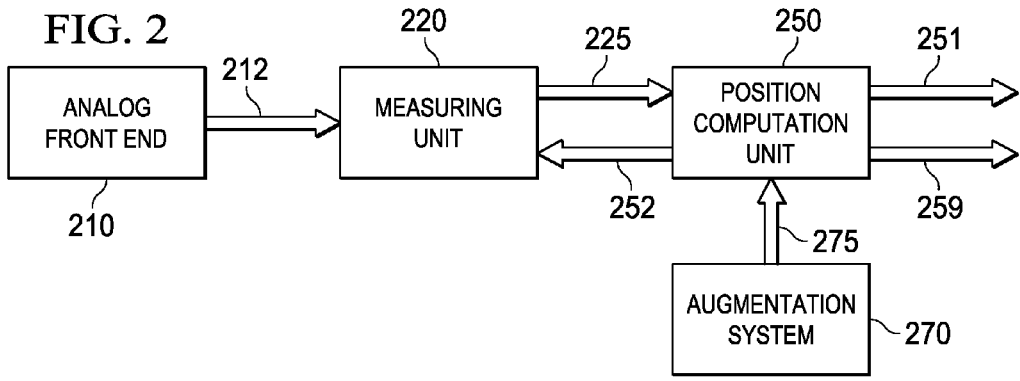
FIG. 2 is a block diagram illustrating an example GPS receiver system of FIG. 1.

FIG. 1A is an example device in which various aspects of the present disclosure are seen. As shown, the device 100, in one of the embodiments, comprises a power management unit 110, an input/output (I/O) system 121, a display system 129, a sensor system 130, an audio system 140, a processor 150, a GPS receiver system 160, a memory system 170, an inertial navigation system 180, and a communication system 190. Each element is described in further detail below.

The power management unit 110 powers the device 100 for a desired operation. The power management unit 110 supplies power from batteries, line power or both. For example, if device 100 is used as a mobile device, then the power is supplied from a battery. On the other hand, if the device 100 is stationary, it is operated from line power by connecting the device to power line (e.g., a power socket). Thus, the power management unit 110 enables the device 100 to operate on battery and/or on power lines. In some embodiments, the power management unit 110 further comprises circuitry, integrated circuits and other functional modules to manage and distribute power to various components 110 through 190 according to the power requirements of the respective components.

The I/O system 121 enables an exchange of information, data or commands to and from the device 100 with external systems or a user. The I/O system 121 comprises, but is not limited to, a keyboard/pad, touch screen, USB ports, wireless ports, smart card interface, mouse and/or other control devices. Each component in the I/O system 121 is configured to operate as prescribed by one or more standards.

The display system 129 is configured to provide a visual output to the user of the device 100. The display system 129 comprises display devices such as, but not limited to, a display screen capable of displaying pictures, video and 3D pictures, 3D video, one or more LED status indicators, projectors, night vision lights, together with their associated drivers and ancillary components. The display system 129 receives information or data in a predetermined format and displays the data on one or more display devices in accordance with the predetermined format.

The sensor system 130 is configured to determine the status and conditions around the device 100. The sensor system 130 comprises multiple sensors deployed throughout the device 100 to determine the condition around the device 100 by working in conjunction with one another or independently of one another. In one embodiment, the sensor system 130 is configured to determine the context under which the device 100 is being used. The sensor system 130 includes sensors such as, but not limited to, sensors for measuring temperature, humidity, motion, torque, magnetic orientation and/or other parameters. In one embodiment, the sensor system 130 includes sensor data processing functionality, circuitry and components.

The audio system 140 manages the audio interface to device 100. The audio system 140 is configured to receive an audio signal from user or from other device(s) through one or more microphones (not shown). The audio signal(s) generated within the device 100 such as sound alerts, etc., are provided to one or more speakers. In one embodiment, the audio system 140 includes other ancillary functionality and components (such as speech recognition) to enable the device 100 to recognize spoken user commands through a suitable audio interface.

The communication system 190 is configured to establish communication between the user device 100 and external system(s)/device(s) through one or more wireless communication channels. In one embodiment, the communication system 190 comprises functionality and components that enable the device 100 to transmit and receive data according to one or more of communication standards such as, but not limited to, GSM, CDMA, GPRS, Wi-Fi, LAN, and Bluetooth. Thus, the data from other components 110 through 180 is exchanged over one or more wireless channels through the communication system 190.

The inertial navigation system 180 is configured to determine the position, velocity, acceleration and/or direction of the device 100 using inertial navigation techniques. The inertial navigation system 180 comprises an accelerometer to determine speed, a compass to determine direction and optionally other ancillary sensors. The inertial navigation system 180 is configured to determine the position of the device 100 from known (previous) positions by monitoring at least the output of the accelerometer and of the compass. The information provided by the inertial navigation system 180 is used in other systems.

The GPS receiver system 160 is configured to receive signals from multiple GNSS satellites and to perform signal processing, data processing and computations to generate an output comprising a position and velocity solution according to various aspects of present disclosure.

The memory system 170 is configured to store data and instructions (e.g., one or more programs) for execution by the processor 150. The memory system 170 provides a direct interface with other system in the device 100 or through the processor 150. The memory system 170 comprises one or more of data memory and program memory. The memory system 170 includes, but is not limited to, different types of Read Only Memory (ROM), Random Access Memory (RAM), external memory disks, removable disks, flash, caches and data cards, for example.

The processor 150 is configured to execute instructions to perform various mathematical and control operations. The processor 150 comprises one or more processors or processor cores operating in conjunction to execute multiple instructions sequentially or simultaneously. The processor 150 comprises processors or cores customized to efficiently perform specific tasks, such as one or more Digital Signal Processing (DSP) cores, Math co-processors etc. In one embodiment, the processor 150 is configured to perform operations related to systems 110 through 140 and 160 through 190 by executing a respective set of instructions (programs) stored in, for example, the memory system 170. Thus, the processor 150 lends processing power to systems 110 through 140 and 160 through 190 and operates as part of the respective system. The operations performed for each system are represented in FIG. 1B.

FIG. 1B is a block diagram showing further aspects of the processor 150 in the device 100, according to one embodiment. The I/O engine 125 is configured to execute program instructions related to the I/O system 121 and to the display system 129. The sensors management engine 135, the audio system engine 145, the communication protocol engine 195, the inertial navigation system engine 185, and the GPS engine 165 are configured to execute program instructions related to the sensor system 130, the audio system 140, the communication system 190, the inertial navigation system 180 and the GPS receiver system 160, respectively.

The core engine 155 is configured to execute program instructions related to various applications incorporated within the device 100, to provide the user with corresponding functionalities. The GNSS application engine 169 is configured to execute program instructions related to various GNSS applications such as car navigation, geo-fencing and/or other navigation and position-based applications. The inter process communication engine 115 is configured to execute instructions to exchange data and control various other engines shown in FIG. 1B. Each program (in general, a set of computer instructions which, when executed, causes a desired useful result/output) is stored in program memory in the memory system 170.

FIG. 2 is a block diagram illustrating the GPS receiver system 160, according to one embodiment. As shown, the GPS receiver system 160 comprises an analog front end 210, a measuring unit 220, a position computation unit 250, and an augmentation system 270. Each unit is further described below.

Analog front end (AFE) 210 is configured to receive signals from multiple GNSS satellites and to convert each received signal to a digital data stream. For example, in case of a GPS receiver system, the AFE 210 is configured to receive a spread spectrum signal in the approximate range of 1575 MHz and to convert the received signals to a sequence of pseudo codes (C/A or P-code). The AFE 210 comprises an appropriate receiving antenna, analog and digital filters, amplifier stages, RF and IF signal processors, down converters, automatic gain controllers (AGC), analog to digital converters and/or other analog and digital domain signal processing units. The AFE 210 is configured to provide the digital data stream of each satellite on path 212 to the measuring unit 220. The AFE 210 may be implemented using any known technique.

The measuring unit 220 is configured to receive a digital data stream from AFE 210 over path 212 and to provide range parameters comprising pseudorange ($\rho$), residual pseudorange error ($\Delta\rho$), and measurement error covariance (R) of the measurements for each satellite over path 225. In one embodiment, pseudorange of each satellite is obtained by multiplying the time taken by the respective satellite signal to reach the receiver with the speed of light. However, due to various inaccuracies in the time measured, the measured range may be inaccurate. As is known, the residual pseudorange generally refers to the difference between the measured pseudorange and a known position. In one embodiment, the measuring unit 220 uses any known technique to compute/determine the range parameters such as the pseudorange ($\rho$) and the residual pseudorange error ($\Delta\rho$).

In one prior technique, the measurement of the error covariance R is determined as a function of the SNR (Signal t0 Noise Ratio) and a tracking loop error. Well known mathematical computations are used to determine the measurement error covariance based on the SNR and tracking loop error for each satellite measurement. The determination of measurement error covariance based on (or as function of) only SNR and tracking loop error is referred herein as "$R_{old}$". Prior techniques are not described here for the sake of brevity.

According to one embodiment, the measuring unit 220 is configured to determine R as function of the SNR, the tracking loop error, correlation peak shape, and measurement inconsistency. Thus, according to one embodiment, the measurement error covariance (R) for each satellite is represented mathematically as:

$$R = f\left(\frac{S}{N}, \text{Tracking loop error,} \right. \quad (1)$$
$$\left. \text{Correlation peak shape, measurement inconsistency}\right)$$

Accordingly, in one embodiment, the measurement of error covariance (R) for N satellites is represented by column matrix as:

$$R = \begin{bmatrix} R_1 \\ \vdots \\ R_N \end{bmatrix} \quad (2)$$

in which R is a column vector representing the measurement error covariance metrics for N satellites and $R_1$ through $R_N$ respectively represent the measurement error covariance for satellite 1 through N computed according to equation 1. Though R is shown as function of all four parameters, in an alternative embodiment, for some or all the satellites, R is computed by omitting one or more parameters (or set to a constant value). The manner in which R is computed as a function of correlation peak shape (one of the parameters in equation 1) is described below.

In one embodiment, the measuring unit 220 is configured to perform the correlation of predefined pseudo code of a particular satellite with the digital data stream corresponding to that satellite to determine the correlation peak. The correlation peak is determined using any known peak detection techniques. The time reference of the correlation peak is used to determine the pseudorange ($\rho$) and residual pseudorange error ($\Delta\rho$). The shape of the correlation peak is used to determine and quantify a possible error in the measurement. The manner in which, in one embodiment, various correlation peak shapes are considered to alter the measurement error covariance (R) is illustrated with example of correlation peak shapes below.

In one example implementation, the measuring unit 220 is configured to determine the quality or characteristic of the correlation peak shape. For example, the quality or characteristic of the correlation peak shape is determined based on parameters such as, but not limited to, the symmetricity of the peak shape, the number of peaks in the correlation peak shape, the repetition of peaks in the peak shape, among other possible parameters.

FIGS. 3A through 3D illustrate correlation peak shapes that represent different operating conditions of the device 100, according to various embodiments.

Figure 3A:
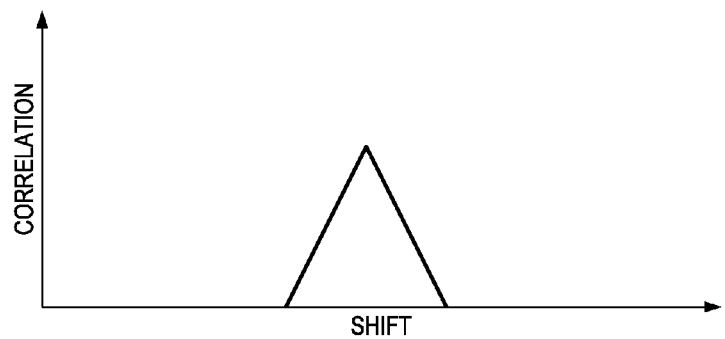
FIG. 3A through 3D, show example correlation peak shape characteristics corresponding to conditions in which the device of FIG. 1 is operated in one of the embodiments.
Figure 3B:
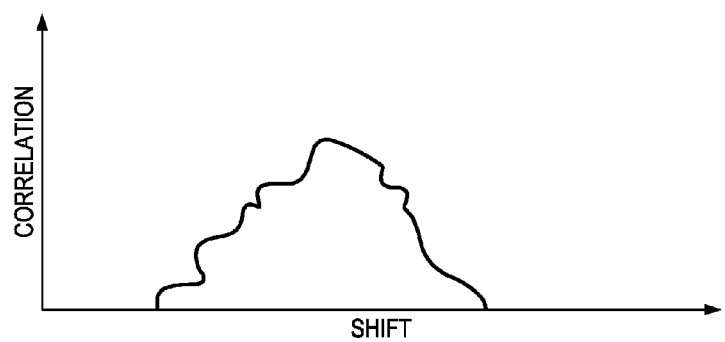
Figure 3C:
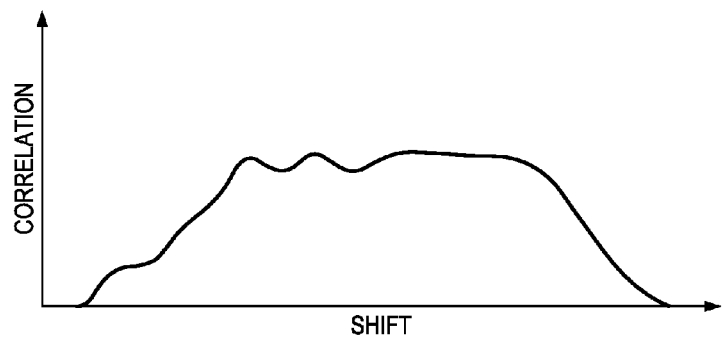

The correlation peak shape in FIG. 3A exhibits a well-defined single peak symmetric correlation peak shape that may correspond to the device 100 being operated under open and clear sky with no obstructions. The correlation peak shape in FIG. 3B exhibits a smeared (spread) correlation peak shape that may represent a noisy operating condition such as cloudy sky or a signal inside a building with low SNR. The correlation peak shape shown in FIG. 3C exhibits multiple peaks with one dominant correlation peak representing an operating condition associated with a highly urban setting with multiple multipath signals converging at the device 100. The correlation peak shape in FIG. 3D exhibits a distinct repetition of a correlation peak, representing a possible operating condition in which multipath signals reflect from one or more objects. Thus, each correlation peak shape exhibits a characteristic shape that corresponds to the prevalent conditions in which device 100 is operated. However, it may be appreciated that an operating condition may exhibit selected ones or all of the characteristics shown in FIGS. 3A through 3D. Therefore, it is to be understood that the characteristics shown in FIGS. 3A through 3D are shown separately and independently merely for ease of understanding.

According to one embodiment, the measuring unit 220 is configured to determine the value of the measurement error covariance R as being proportional to one or more characteristics in the shape of the correlation peak. For example, in one embodiment, the measuring unit 220 is configured to determine the measurement error covariance R as proportional to the number of peaks (as in case of FIG. 3C) and/or width of the smear (as in case of FIG. 3B) and/or distance between first and second distinct peak shape (as in case of FIG. 3D).

However, the correlation peak shapes of FIGS. 3A through 3D are provided merely for illustration and should not be construed as limiting. Persons of ordinarily skilled in the relevant art may extract various other characteristics of the correlation peak and make use of the same by reading this disclosure.

Continuing further, the manner in which measuring unit 220 determines the measurement error covariance (R) as function of measurement inconsistency is further described below.

Figure 4:
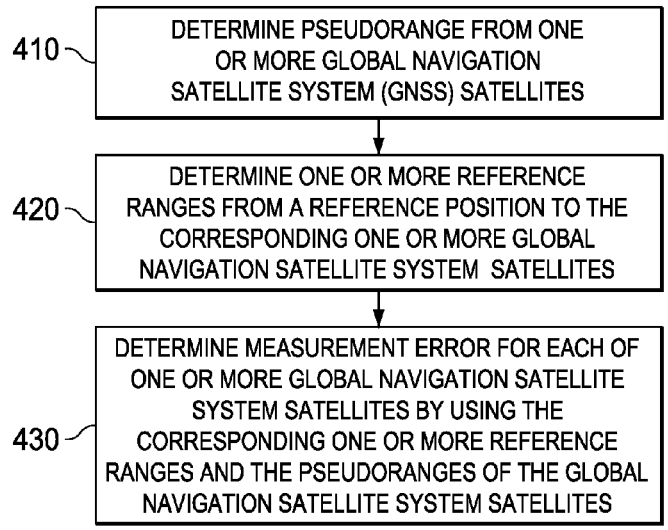
FIG. 4 is a block diagram illustrating the manner in which the measurement error is determined in one embodiment of the present disclosure.

FIG. 4 is a block diagram illustrating the manner in which the measurement error is determined in one embodiment of the present disclosure. In block 410, the measuring unit 220 determines a pseudorange from one or more Global Navigation Satellite System (GNSS) satellites. In block 420, the measuring unit 220 determines one or more reference ranges from a reference position to the corresponding one or more GNSS satellites. In block 430, measuring unit 220 determines measurement error for each of one or more GNSS satellites by using the corresponding one or more reference ranges and the pseudoranges of the GNSS satellites.

In one embodiment, the measurement error is computed as proportional to the difference between the reference range and the measured pseudorange of the GNSS satellite. In an alternative embodiment, measuring unit 220 uses the difference as one of the parameter along with the parameters SNR, tracking loop error, and correlation peak shape to determine the measurement error. Due to use of the reference range, the accuracy of the measurement error is enhanced. The determination of the measurement error in an example embodiment of the present disclosure is further illustrated below.

Figure 5:
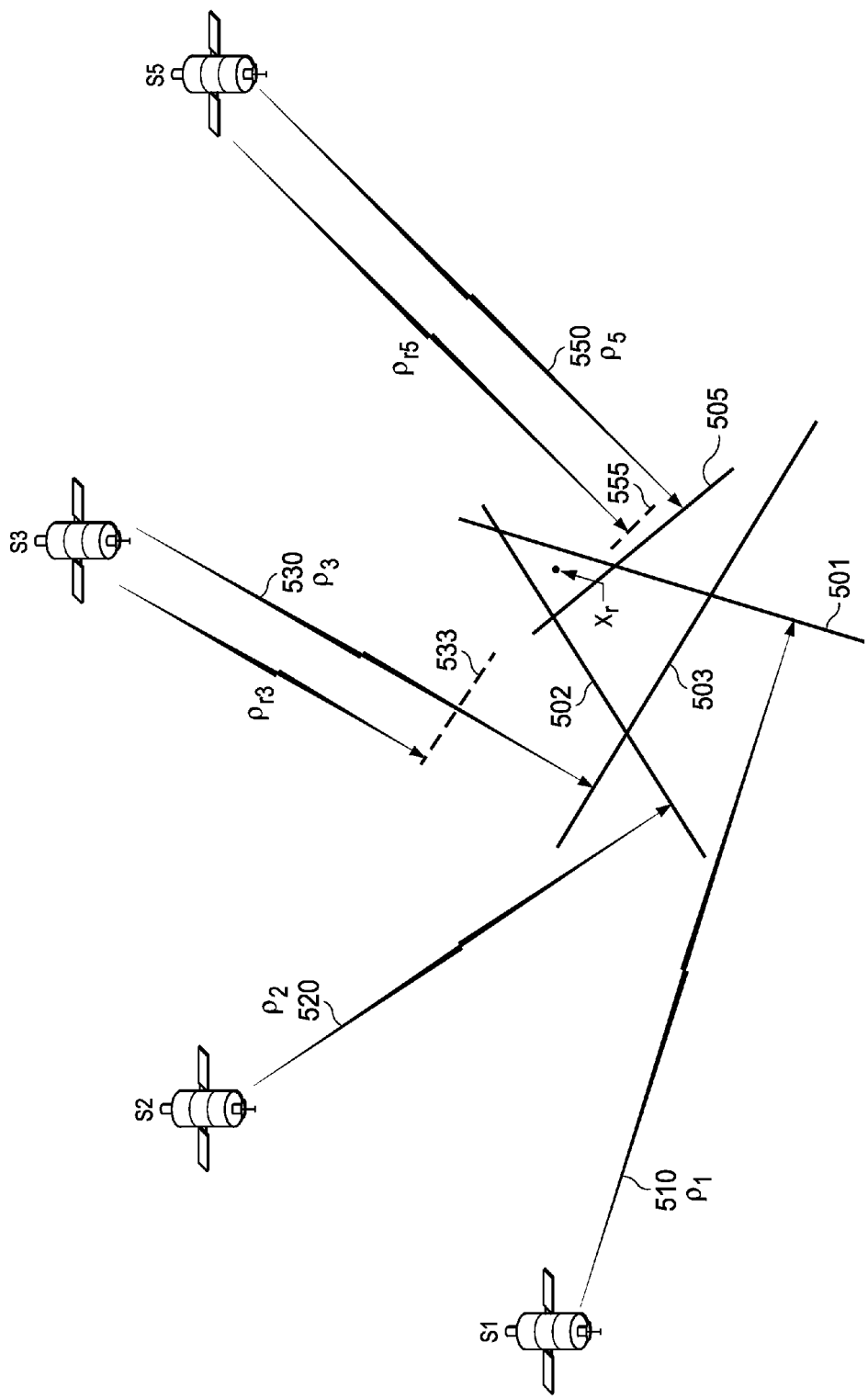
FIG. 5 is a line diagram depicting pseudoranges from four satellites illustrating measurement inconsistency, according to one embodiment.

FIG. 5 is a line diagram depicting the pseudoranges from four satellites, to illustrate an example of the determination of measurement inconsistency. References S1, S2, S3 and S5 denote four different satellites. Lines 510, 520, 530 and 550 represent the signal path from satellites S1, S2, S3 and S5, respectively. In the FIG. 5, the paths are shown as non-overlapping merely for ease of understanding. However, in reality, the signal paths of the satellites may overlap. In FIG. 5, $\rho_1$, $\rho_2$, $\rho_3$, and $\rho_5$ represent the pseudoranges determined for satellites S1, S2, S3 and S5, respectively, at time t (as determined by, e.g., the measuring unit 220).

Lines 501, 502, 503, and 505 represents imaginary equidistance line at a distance $\rho_1$, $\rho_2$, $\rho_3$, and $\rho_5$ from satellites S1, S2, S3 and S5, respectively. Point $X_r$ represents the reference position of the device 100. Reference pseudoranges $\rho_{r3}$ and $\rho_5$ represent the pseudoranges from known satellite position to the reference position $X_r$ for satellites S3 and S5, respectively. In one embodiment, the reference pseudorange is computed as a vector difference between a known satellite position obtained from almanacs of the satellite and the reference position $X_r$. Reference pseudorange $\rho_{r1}$ and $\rho_{r2}$ are not shown in FIG. 5 merely to keep line diagram simple to understand. However, one skilled in the art will readily be able to determine the other two references ranges by reading this disclosure.

The reference position $X_r$ is sourced to measuring unit 220 on path 252 from different sources. In one example, the reference position $X_r$ is obtained from the position estimate of a Kalman filter (part of the position computation unit 250 as described in the later section below). In an alternative example, the reference position $X_r$ is obtained from a (GPS) augmentation system 270 such as an inertial navigation system, cellular navigation system, etc.

In yet another example of the present disclosure, the position computation unit 250 determines the position from the pseudoranges $\rho_1$, $\rho_2$, $\rho_3$, and $\rho_4$ and old measurement error covariance $R_{old}$ computed as a function of SNR and the loop error. The position thus computed using $R_{old}$ is then sent to the measuring unit 220 as reference position $X_r$ to recalculate and determine a new measurement error covariance R.

Measuring unit 220 is configured to determine the difference (representing the measurement inconsistency) between the measured range $\rho_1$, $\rho_2$, $\rho_3$, and $\rho_4$ and the reference ranges $\rho_{r1}$, $\rho_{r2}$, $\rho_{r3}$, and $\rho_{r4}$ for each satellite. Accordingly, the measuring unit 220 is configured to determine the measurement error covariance R as function of/proportional to the absolute value of the difference (measurement inconsistency), which is represented as:

$$R \propto (\rho - \rho_r)^3 \qquad (3)$$

The measurement error covariance for satellites S1 through S4 is represented as:

$$R_1 \propto (\rho_1 - \rho_{r2})^2, R_2 \propto (\rho_2 - \rho_{r2})^2, R_3 \propto (\rho_3 - \rho_{r3})^2, \text{ and } R_4 \propto (\rho_4 - \rho_{r4})^2. \qquad (4)$$

As an example, referring to FIG. 5, since the measurement inconsistency is higher in case of satellite S3, the measurement error covariance $R_3$ is set to a higher value, as compared to the measurement error covariance of other satellites S1, S2 and S5. Further, the above technique is selectively applied based on the operating conditions of the device 100.

Figure 6:
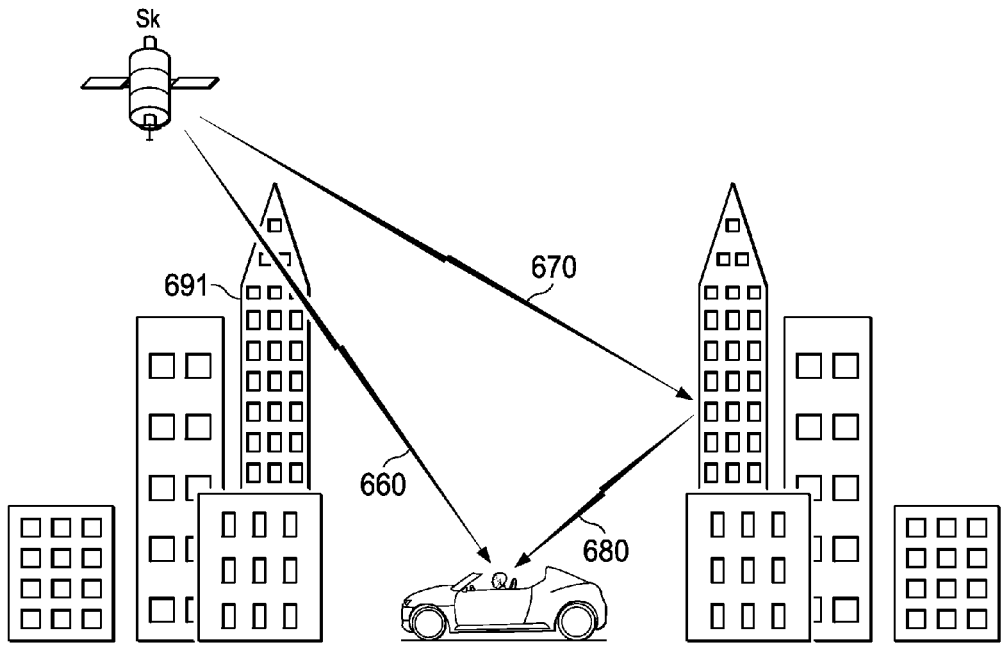
FIG. 6 is an example diagram showing a multipath condition.

FIG. 6 illustrates an example multipath condition. The device 100 (in the automobile) receives both a reflected signal 680 and a direct signal 660. The direct signal 660 is attenuated by building 691. The measuring unit 220 is configured to measure the range from the reflected signal based on signal strength and/or correlation peak shape. As a result, the total measured range is the sum of the range of the signal 670 and the signal 680. Thus, in the example multipath scenario of FIG. 6, the measured range is greater than the real range. Hence the difference $\rho - \rho_r$ is a positive number for a multipath-affected pseudorange.

Thus, in order to reduce the inaccuracy in receiver output due to multipath conditions, the measuring unit 220 is configured to alter the value of the old measurement error covariance $R_{old}$ if the difference $\rho - \rho_r$ is positive, in one embodiment. If the difference is negative, the covariance is computed by considering SNR, loop error and the shape of the correlation peak. Accordingly, in FIG. 5, as the difference $\rho_2 - \rho_{r2}$ is negative (as is apparent from FIG. 5), the measurement error covariance $R_2$ for satellite S2 is computed using the SNR, the loop error and/or correlation peak shape.

Figure 3D:
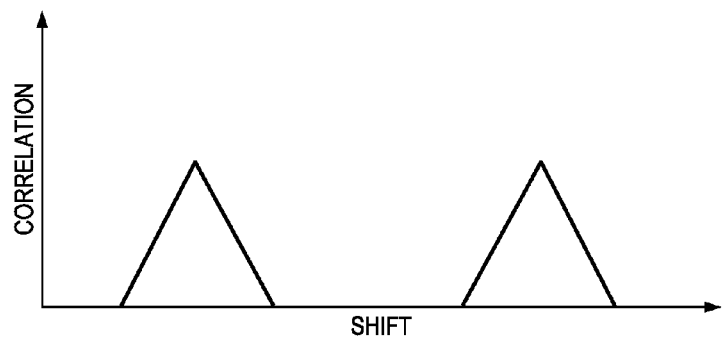

Further, the measuring unit 220 is further configured to detect the multipath condition and switch the measurement error covariance computation techniques. The measuring unit 220 is configured to detect the operating condition based on the correlation peak shapes. For example, if the correlation peak shapes contains multiple or repetitive peaks as is shown in FIG. 3D, the measuring unit 220 concludes that the operating condition is a multipath condition.

The manner in which measurement error covariance R is computed in a solution space (coordinate system in which position solution is computed) according to one embodiment is described below.

Considering the reference position $X_r$, the reference pseudorange $\rho_r$ is represented as:

$$\rho_r = |\vec{X}_r - \vec{X}_s| = \sqrt{(X_{rx} - X_{sx})^2 + (X_{ry} - X_{sy})^2 + (X_{rz} - X_{sz})^2} \qquad (5)$$

in which $X_s$ represents the position of satellite, the symbol $\rightarrow$ represents vector, and subscripts x, y, and z represent the components in an example coordinate system/solution space (such as a Cartesian coordinate system).

Similarly, representing the true position of the device 100 as X, the measured pseudorange ρ is expressed as:

$$\rho = |\vec{X}_x - \vec{X}_s| = \sqrt{(X_{Xx} - X_{sx})^2 + (X_{Xy} - X_{sy})^2 + (X_{Xz} - X_{sz})^2} + e \quad (6)$$

in which e represents the total measurement error. From Equation 5 and 6, the linearized difference is represented as:

$$\rho_r - \rho = H(X_r - X) + e \quad (7)$$

in which H is an n×4 matrix, which comprises of unit vectors pointing from the approximate user position to all (or n) the visible satellites.

From equation 7, an estimate of total measurement error represented by $E[ee^T]$ is obtained by performing the operations as below:

$$E[(\rho_r - \rho)(\rho_r - \rho)^T] = E[(H(X_r - X) + e)(H(X_r - X) + e)^T] \quad (8)$$

Substituting $(\rho_r - \rho) = \Delta\rho$, $(X_r - X) = \Delta X$, and assuming ΔX and e are uncorrelated, equation 8 is written as;

$$E[(\Delta\rho)(\Delta\rho)^T] = E[H(\Delta X)(\Delta X)^T H^T] + E[ee^T] \quad (9)$$

In the equation 9, $E[ee^T]$ is equated to measurement error covariance (R) and equation 9 is rewritten as:

$$R \approx E[ee^T] \approx E[(\Delta\rho)(\Delta\rho)^T] - HE[(\Delta X)(\Delta X)^T]H^T] \quad (10)$$

In equation 10, the term $E[(\Delta X)(\Delta X)^T]$ represents the estimate of reference position uncertainty/error covariance. The other term $E[(\Delta\rho)(\Delta\rho)^T]$ in equation 10 is estimated by observing residual pseudorange error over a time period as:

$$E[(\Delta\rho)(\Delta\rho)^T] = \frac{\sum_N (\Delta\rho)(\Delta\rho)^T}{N} \quad (11)$$

in which N represents the observation window length. Thus, from equation 10 and 11, a (new) measurement error covariance R is computed as a function of measurement inconsistency as:

$$R \cong \frac{\sum_N (\Delta\rho)(\Delta\rho)^T}{N} - HCH^T \quad (12)$$

In the above equation Δρ represents residual pseudorange error, H represents the solution matrix, C represents estimate of error covariance from term $E[(\Delta X)(\Delta X)^T]$, and operator "T" represents the transpose of a matrix and operator E[.] represents the expectation operator. The measurement error covariance R determined as described in the sections above is provided to position computation unit 250 over path 225.

The position computation unit 250 is, according to one embodiment, configured to receive pseudorange (ρ), residual pseudorange error (Δρ), and measurement error covariance (R) over path 225 and to determine the position, velocity and state error covariance. The manner in which the position computation unit 250 computes a position solution in collaboration with the measuring unit 220 is described in further detail below.

Figure 7:
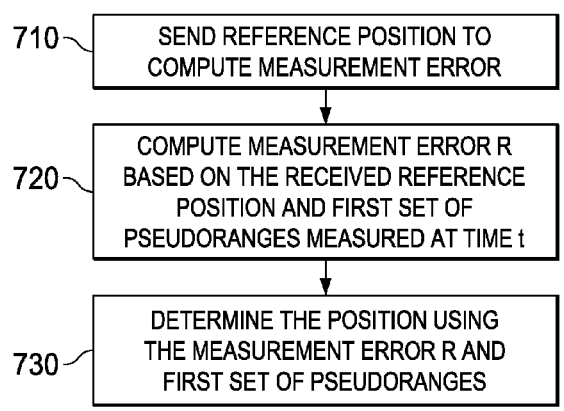
FIG. 7 is a flowchart illustrating the manner in which the inaccuracy in the position and the velocity solution is reduced, according to one embodiment.

FIG. 7 is a flowchart illustrating the manner which inaccuracy in the GNSS receiver output is reduced in one example of the present disclosure.

In block 710, the position computation unit 250 sends reference position ($X_r$) for computing measurement error (covariance) R. The position computation unit 250 sends the reference position ($x_r$) to the measuring unit 220. In one embodiment, the position computation unit 250 sends the reference position ($X_r$) to other unit operating interactively with the measuring unit 220 to compute R. The position computation unit 250 is programmed to suitably select reference position ($X_r$) from one or more options such as but not limited to: position estimate generated by the Kalman filter, prior position computed corresponding measurement at a $(t-t1)^{th}$ time instant, position input from the inertial navigation system 180, a position input from cellular system, a reference position received from the I/O system 121, and/or a position computed from an old measurement error covariance $R_{old}$.

In block 720, the measuring unit 220 computes the measurement error (covariance) R based on the received reference position and a first set of pseudoranges measured at time t. The measuring unit 220 computes the measurement error covariance R as described in the sections above. In one example, the measuring unit 220 computes the measurement error covariance R in accordance with the description associated with FIG. 4, 5 and/or equation 12. The measuring unit 220 sends the measurement error covariance R along with the pseudoranges to the position computation unit 250.

In block 730, the position computation unit 250 determines the position and/or velocity using measurement error covariance R and set of pseudoranges measured at time t. In one example, the position computation unit 250 uses the measurement error covariance R (R1 through RN) computed for each pseudorange to weight respective contributions in determining the position solution, thus giving higher importance to the better quality measurements and lower importance to comparatively poorer quality measurements.

Thus, in one embodiment the measuring unit 220 and position computation unit 250 is configured to interactively operate to generate an accurate position output. An example computation of position and error covariance is described with reference to a Kalman filter technique according to one embodiment. However, the teachings of the present disclosure may be applied/used in other position computation techniques by persons of ordinary skill in the relevant art by reading the present disclosure.

Figure 8:
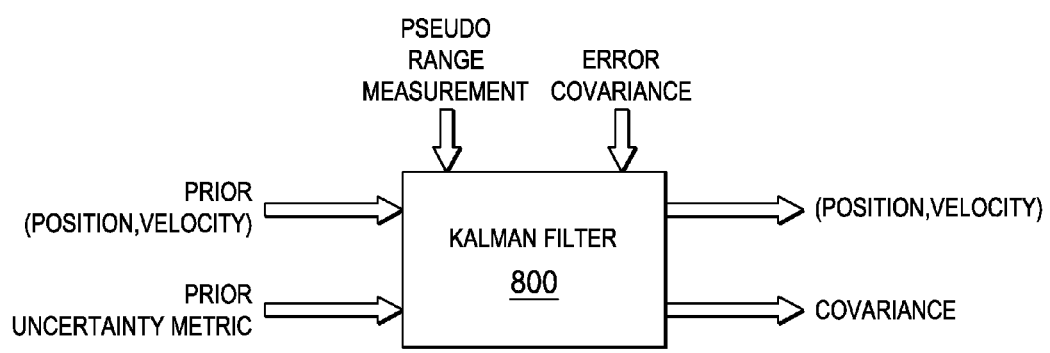
FIG. 8 is a block diagram of an example Kalman filter.

FIG. 8 is a block diagram illustrating the determination of GNSS receiver output using a Kalman filter, according to one embodiment. The Kalman filter 800 is shown receiving prior position ($X_{k-1}$), prior velocity ($v_{k-1}$), prior uncertainty ($C_{k-1}$), satellite measurements (ρ), and measurement error covariance (R). The Kalman filter 800 is shown as providing position output $X_k$, velocity output $V_k$ and state error covariance $C_k$ (an example of error covariance).

In one embodiment, Kalman filter 800 operates in two stages. In the first stage, the position and velocity is forward estimated (apriori) from time step K−1 to time step K. An example a priori position $\hat{X}_k$ estimation from K−1 to K time step is performed as:

$$\hat{X}_k = A * X_{K-1} + P_k \quad (13)$$

Correspondingly, the state covariance matrix (error covariance) is updated to K time step from K−1 time step as:

$$\hat{C}_k = A * CX_{K-1} A^T + Q_k \quad (14)$$

in which A represents the state transition matrix of the Kalman filter and $Q_k$ and $P_k$ represent process noises. In one example, the estimated position state $\hat{X}_k$ is provided as a reference position to measuring unit 220 as in block 720 of FIG. 7. Thus, the measuring unit 220 is configured to compute the measurement error covariance R using the estimated a priori $\hat{X}_k$. The computed measurement error covariance R is provided to the Kalman filter 800 for computation of position $X_k$, velocity $V_k$ and error covariance $C_k$ in the second stage.

In second stage, a priori position $\hat{X}_k$ and predicted error covariance $\hat{C}_k$ is blended with the satellite measurement and the measurement error covariance R to determine the $K^{th}$ state position, velocity and error covariance. One way of determining the $k^{th}$ state position and error covariance is described for illustration.

In the second stage, at first, the Kalman filter 800 uses the a priori position $\hat{X}_k$ and $\hat{C}_k$ to determine the Kalman gain $K_k$ as:

$$K_k = \hat{C}_k H^T (H \hat{C}_k H^T + R) \qquad (15)$$

The Kalman gain of above equation 15 is used to compute $K^{th}$ state position (a posteriori) as:

$$X_k = \hat{X}_k + K_k(\rho - H\hat{X}_k) \qquad (16)$$

Correspondingly, the error covariance for $K^{th}$ state is computed as:

$$C_k = (I - K_k H)\hat{C}_k (I - K_k H)^T + K_k R K_k^T \qquad (17)$$

in the above equations, I represents an identity matrix that depends on the size of the Kalman filter used and other notations representing their usual operations.

The measuring unit 220 and the position computation unit 250 interactively work together in various ways. For example, the measuring unit 220 computes and provide $R_{old}$ to the position computation unit 250. The position computation unit 250 then computes $K^{th}$ state position solution using $R_{old}$ in place of R in equations 15, 16 and 17. The computed $K^{th}$ state position is provided as reference position to measuring unit 220 for computing R. The measuring unit 220 then computes the measurement error covariance R using the reference position. The Kalman filter is re-run (according to equation 15-17) with the R to obtain the new $K^{th}$ state position.

As a further alternative, equation 15 and 16 is computed using $R_{old}$ thereby not affecting the Kaman filter states. The R is used in equation 17 to provide a more accurate error covariance. Thus, the position and state error covariance computed in accordance with the various aspect of the present disclosure described in sections above reduces the inaccuracy due to operating condition of the device 100.

Though the description is made with reference to computations of Position $X_k$ and state error covariance $C_k$, the techniques described and shown herein is extended to compute a velocity measurement as well. For example, in the above equations, the pseudorange measurements are replaced with the Doppler shift measurements to compute the corresponding velocity measurement.

While various examples of the present disclosure have been described above, it should be understood that they have been presented by way of example only, and not limitation. Thus, the breadth and scope of the present disclosure should not be limited by any of the above-described examples, but should be defined only in accordance with the following claims and their equivalents.

What is claimed is:

1. A method of operating a navigation assistant that includes a Global Navigation Satellite System receiver, comprising:

determining in circuitry in a the Global Navigation Satellite System receiver a first pseudorange from a first Global Navigation Satellite System satellite;

determining in the Global Navigation Satellite System receiver circuitry a reference range from a reference position to the first GNSS satellite;

determining in the Global Navigation Satellite System receiver circuitry a measurement error as a function of the difference between the reference range and the first pseudorange;

weighing in the Global Navigation Satellite System receiver circuitry the first pseudorange by the measurement error;

computing a position solution from a set of pseudoranges that include the weighed first pseudorange, the position solution includes at least one of a position, velocity, and error covariance and the reference position is an a priori position estimate of a Kalman filter determined from a prior position;

determining in the Global Navigation Satellite System receiver circuitry a measurement error covariance as function of the difference only if the measured pseudorange is greater than the reference pseudorange;

computing the measurement error covariance in the Global Navigation Satellite System receiver circuitry at least partially according to:

$$R = \frac{\sum_N (\Delta \rho)(\Delta \rho)^T}{N} - HCH^T$$

in which R represents the error covariance, $\Delta\rho$ represents a residual pseudorange error of the first set of satellites, H represents an n×4 matrix comprising unit vectors pointing from an approximate user position to the n visible satellites, C represents an estimate of error covariance from term $E[(\Delta X)(\Delta X)^T]$, N is an integer representing an observation window, the operator $^T$ represents a transpose operation and the operator, $\Sigma$ represents a summation operation;

determining in the Global Navigation Satellite System receiver circuitry a second measurement error as function of a correlation peak shape;

modifying, in the Global Navigation Satellite System receiver circuitry, the measurement error based on the second measurement error; and providing the measurement error based on the second measurement error to the navigation assistant.

2. The method of claim 1, including:

determining a $K^{th}$ state position $X_k$ in a Kalman filter as $X_k = \hat{X}_k + K_k(\rho - H\hat{X}_k)$, wherein $\hat{X}_k$ is a prior state position of the Kalman filter, $\rho$ is vector representing set of pseudoranges, and $K_k$ is a Kalman gain determined as $K_k = \hat{C}_k H^T (H\hat{C}_k H^T + R)$, wherein $\hat{C}_k$ is a prior state error covariance of the Kalman filter.

3. The method of claim 2, further comprising:

determining $K^{th}$ state error covariance $C_k$ of the Kalman filter as $C_k = (I - K_k H)\hat{C}_k (I - K_k H)^T + K_k R K_k^T$, wherein $\hat{C}_k$ representing an a priori error covariance of Kalman filter.

4. A navigation assistant that includes a Global Navigation Satellite System (GNSS) receiver, comprising:

a measuring unit configured to determine a measurement error covariance from a reference position and a set of measured pseudoranges from a first set of GNSS satellites;

a position computing unit configured to determine navigational information from the measurement error covariance and the set of measured pseudoranges, the reference position includes an estimated position of a Kalman filter estimated from a prior position and a prior uncertainty metric, and a position solution includes at least one of a position, velocity, and error covariance;

a referencing unit configured to determine a reference pseudorange from the reference position to a first satellite in the first set of GNSS satellites;

a difference unit configured to determine a difference between the reference pseudorange and the measured pseudorange corresponding to the first satellites;

the measuring unit is configured to determine the measurement error covariance as function of the determined difference;

the measuring unit is further configured to determine the measurement error covariance as function of the difference if the measured pseudorange is greater than the reference pseudorange;

the measuring unit is further configured to determine the measurement error covariance at least partially according to:

$$R = \frac{\sum_N (\Delta\rho)(\Delta\rho)^T}{N} - HCH^T$$

in which R represents an error covariance, $\Delta\rho$ represents a residual pseudorange error of the first set of GNSS satellites, H represents an n×4 matrix of unit vectors pointing from an approximate user position to the n visible satellites, C represents an estimate of error covariance from term $E[(\Delta X)(\Delta X)^T]$, N is an integer representing an observation window, the operator $^T$ represents a transpose operation and the operator $\Sigma$ represents a summation operation;

the measuring unit is further configured to determine the measurement error covariance as function of all of the difference, the correlation peak shape, a received signal to noise ratio and a tracking loop error; and the measuring unit providing the measurement error covariance to the navigation assistant.

5. The navigation assistant of claim 4, wherein the measuring unit is further configured to determine state error covariance at least partially from:

$$C_k = (I - K_k H)\hat{C}_k (I - K_k H)^T + K_k R K_k^T)$$

wherein $C_k$ representing a state error covariance, $K_k$ representing a gain of the Kalman filter, and $\hat{C}_k$, representing an a priori error covariance of the Kalman filter.

6. The navigation assistant of claim 5, wherein the measuring unit is further configured to determine a second measurement error covariance as function of correlation peak shape, and is further configured to modify the measurement error covariance based on value of the second measurement error covariance.

* * * * *